United States Patent Office 3,107,241
Patented Oct. 15, 1963

3,107,241
17α - (2 - CARBOXYETHYL)ANDROSTA-4,6-DIENE-3β,17β-DIOL γ-LACTONE AND ESTERS THEREOF
John S. Baran, Morton Grove, Ill., assignor to G. D. Searle & Co., Chicago, Ill., a corporation of Delaware
No Drawing. Filed Mar. 16, 1962, Ser. No. 180,316
5 Claims. (Cl. 260—239.57)

This invention relates to 17α-(2-carboxyethyl)androsta-4,6-diene-3β,17β-diol γ-lactone and its esters, and to processes for the manufacture thereof. More particularly, this invention relates to chemical compounds of the formula

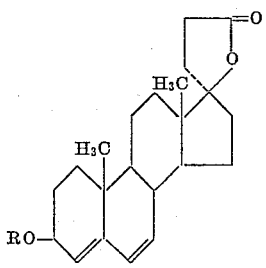

wherein R represents hydrogen or an alkanoyl radical. Among the alkanoyl radicals represented by R, especially lower alkanoyl radicals are preferred, which is to say, radicals of the formula —CO-lower alkyl in which "lower alkyl" designates a methyl, ethyl, propyl, isopropyl, butyl, isobutyl, sec-butyl, tert-butyl, pentyl, neopentyl, hexyl, isohexyl, heptyl, or like saturated, acyclic, straight- or branched-chain, monovalent, hydrocarbon grouping of the formula —$C_nH_{2n+1}$ in which $n$ represents a positive integer less than 8.

Equivalent to the foregoing lactone and its esters for the purposes of this invention are the corresponding hydroxy acids and their alkali salts of the formula

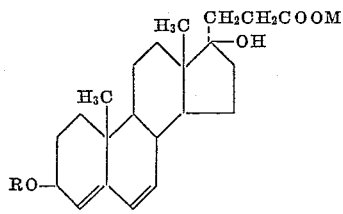

wherein R is defined as before and M represents hydrogen, an alkali metal, or the ammonium radical.

The compounds to which this invention relates are useful because of their valuable pharmacological properties. Thus, for example, they block the effect of desoxycorticosterone acetate on urinary sodium and potassium.

Manufacture of the subject compounds proceeds by contacting 17α-(2-carboxyethyl)-17β-hydroxyandrosta-4,6-dien-3-one γ-lactone (U.S. 2,900,383) with lithium tri-tert-butoxy aluminum hydride in an inert solvent medium, such as tetrahydrofuran, to produce the 3β-ol hereof, which in turn is esterified with alkanoic acid anhydride and pyridine to give the 3β-alkanoyloxy compounds of the invention. A congeneric by-product of the 3β-ol synthesis is 17α-(2-carboxyethyl)androst-4,6-dien-17β-ol γ-lactone, which shares with the other products herein disclosed the anti-desoxycorticosterone activity remarked above.

Those skilled in the art will appreciate that the salts set forth above readily devolve from the corresponding lactones on contact with aqueous alkali, and the free acids are obtained from the salts by a critically brief exposure to a proton source. Prolongation of the exposure time induces lactonization.

The following examples describe in detail compounds illustrative of the present invention and methods whereby these compounds can be prepared. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations are referred to the D line of sodium.

Example 1

A. *17α-(2-carboxyethyl)androsta-4,6-diene-3β-17β-diol γ-lactone.*—A solution of 1 part of 17α-(2-carboxyethyl)-17β-hydroxyandrosta-4,6-dien-3-one γ-lactone and 2 parts of lithium tri-tert-butoxy aluminum hydride in 50 parts of tetrahydrofuran is maintained with agitation at room temperatures for 30 minutes, then cautiously diluted with a mixture of 9 parts of tetrahydrofuran and 1 part of water. The resultant mixture is consecutively acidified with dilute hydrochloric acid, diluted with 4 volumes of water, and extracted with chloroform. The chloroform extract is consecutively washed with water and dilute aqueous sodium bicarbonate, then dried over anhydrous sodium sulfate, and finally stripped of solvent by distillation. Trituration of the residue with ether affords a solid product which, upon crystallization from a mixture of acetone, ether, and hexane, melts at 179–181° and is further characterized by a specific rotation of —71° (1% in chloroform). This material is 17α-(2-carboxyethyl)androsta-4,6-diene-3β,17β-diol γ-lactone, of the formula

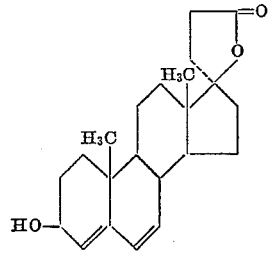

B. *17α-(2-carboxyethyl)androsta-2,4,6-trien-17β-ol γ-lactone.*—From the crystallization mother liquors in the procedure of the foregoing part A of this example, on combination and concentration by distillation, there precipitates a solid which, recrystallized from a mixture of acetone and hexane, melts at 193–195° and has a specific rotation of —65° (1% in chloroform). This material is 17α-(2-carboxyethyl)androsta-2,4,6-trien-17β-ol γ-lactone having the formula

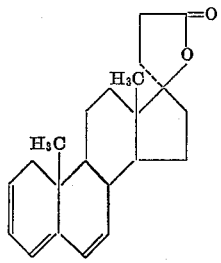

Example 2

*3β-acetoxy-17α-(2-carboxyethyl)androsta-4,6-dien-17β-ol γ-lactone.*—A solution of 2 parts of 17α-(2-carboxyethyl)androsta-4,6-diene-3β,17β-diol γ-lactone in 5 parts of acetic anhydride and 30 parts of pyridine is allowed to stand at room temperatures for 24 hours, then diluted with 3 volumes of a mixture of ice and water. The solid which precipitates is filtered off, dried in air, and crystallized from a mixture of ether and petroleum ether to give 3β-acetoxy-17α-(2-carboxyethyl)androsta-4,6-dien-17β-ol γ-lactone melting at approximately 165–166° and having a specific rotation of −91° (0.51% in chloroform). The product has the formula

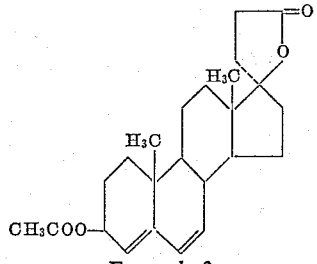

*Example 3*

*17α - (2 - carboxyethyl) - 3β-propionyloxyandrosta-4,6-dien-17β-ol γ-lactone.*—Substitution of 5 parts of propionic anhydride for the acetic anhydride called for in Example 2 affords, by the procedure there detailed, 17α-(2-carboxyethyl) - 3β - propionyloxyandrosta-4,6-dien-17β-ol γ-lactone melting at 158–160° and having a specific rotation of −92° (1% in chloroform). The product has the formula

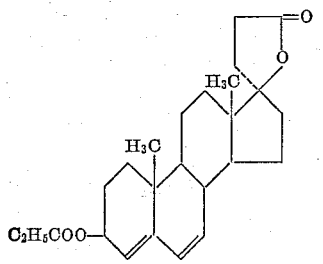

What is claimed is:
1. A compound of the formula

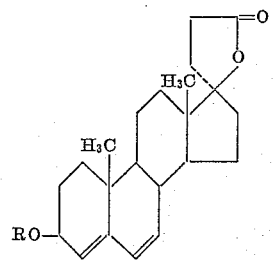

wherein R represents a member of the group consisting of hydrogen and lower alkanoyl radicals.
2. 17α-(2-carboxyethyl)androsta-4,6-diene-3β,17β-diol γ-lactone.
3. 3β - acetoxy-17α-(2-carboxyethyl)androsta-4,6-dien-17β-ol γ-lactone.
4. 17α - (2 - carboxyethyl) - 3β-propionyloxyandrosta-4,6-dien-17β-ol γ-lactone.
5. 17α - (2 - carboxyethyl)androsta - 2,4,6-trien-17β-ol-γ-lactone.

References Cited in the file of this patent
UNITED STATES PATENTS

| 2,900,383 | Cella | Aug. 18, 1959 |
| 2,925,416 | Brown et al. | Feb. 16, 1960 |

OTHER REFERENCES

Selye: Textbook of Endrocinology, Acta Endrocrinolgica, Universite de Montreal, Montreal, Canada, pp. XXXII, 914 (1947) (page 71 depended upon).